Patented Jan. 30, 1945

2,368,255

UNITED STATES PATENT OFFICE 2,368,255

CRYSTALLINE TERNARY ADDITION COMPOUNDS

Robert C. Lyon, New Brunswick, N. J., assignor to E. I. du Pont de Nemours & Company, Wilmington, Del., a corporation of Delaware No Drawing. Application February 7, 1941, Serial No. 377,843

5 Claims. (Cl. 260—575)

This invention relates to new chemical compounds which are useful as photographic developers. More specifically, the invention relates to addition compounds formed of three components; to wit, ortho-phenylene-diamines, polyhydroxy-benzenes, and amino-phenols.

It is known that ortho-phenylene-diamines, polyhydroxy-benzenes, and amino-phenols are three classes of compounds which are useful as photographic developing agents. Moreover, it is known that developing compositions may be made from mixtures of two agents or from addition compounds of two agents. For example, metol and hydroquinone are often used together. Also, the addition compound of para-phenylene-diamine and pyrocatechol has been used as a fine grain developer.

It is an object of this invention to provide new fine grain photographic developers, another object is to provide new chemical compounds suitable as photographic developers. A further object is to provide new developing agents which may be readily prepared in high purity. A still further object is to provide new photographic developing compounds which give the technician greater latitude in the development of latent images. Other objects will appear hereinafter.

These objects have been accomplished by the discovery that certain ortho-phenylene-diamines combine in molecular proportions with polyhydroxy-benzenes and amino-phenols to form addition compounds which are easily crystallized in a state of high purity and which are exceptionally useful as fine grain photographic developers. These compounds are true chemical compounds containing one or more molecules of each of the three components and should not be confused with condensation products formed by the elimination of parts of the components, as, for example, the elimination of water.

In order that the invention may be more fully understood, the following examples are given by way of illustration, although the invention is not limited thereto as will become more apparent hereinafter. In the examples, "parts" signify "parts by weight."

EXAMPLE I

Forty-three and two-tenths (43.2) parts of ortho-phenylene-diamine, 44.0 parts of pyrocatechol, and 43.6 parts of para-amino-phenol are dissolved in 325 parts of water. To this solution is added 4.5 parts of a 30 per cent aqueous solution of sodium bisulfite and 2 parts of decolorizing carbon. The mixture is heated to boiling temperature and 1 part of sodium hydrosulfite is added. The hot mixture is filtered under vacuum. The filtrate is cooled to 10° C. and clear mixtures separate from the mother liquor. One hundred and nine (109) parts of a crystalline product is recovered.

The mother liquor is concentrated and cooled with a recovery of 15 parts of additional crystals. The crystals of the ternary compound having equimolecular portions of ortho-phenylene-diamine, pyrocatechol, and para-amino-phenol have a melting point of 73–74° C.

EXAMPLE II

Twelve and two-tenths (12.2) parts of methyl-4-ortho-phenylene-diamine, 11.0 parts of pyrocatechol, and 10.9 parts of para-amino-phenol are added to 230 parts of water, 1.5 parts of a 37 per cent aqueous solution of sodium bisulfite and 1 part of decolorizing carbon. The mixture is heated until a solution of the first three materials mentioned is obtained and 1 part of sodium hydrosulfite is added. The hot mixture (100° C.) is filtered under vacuum and the filtrate is then cooled to 10° C. Twenty-eight and one-half (28.5) parts of crystals having a melting point of 76–77° C. are recovered from the mother liquor. These are crystals of an equimolecular ternary compound of methyl-4-ortho-phenylene-diamine, pyrocatechol, and para-amino-phenol.

EXAMPLE III

Ten and one-half (10.5) parts of 4-chloro-ortho-phenylene-diamine, 8.2 parts of pyrocatechol, and 8.13 parts of para-amino-phenol are boiled to solution in 300 parts of water and 1 part of sodium bisulfite and 2 parts of decolorizing carbon are added. To the hot mixture is added 1 part of sodium hydrosulfite and then the hot mixture is filtered under vacuum. The filtrate is cooled and 20.4 parts of crystals of an equimolecular ternary compound having a melting point of 76–77° C. are recovered.

EXAMPLE IV

Example III is repeated using, instead of solid chloro-4-ortho-phenylene-diamine, a solution of 10.5 parts of this material in 100 parts of ether. The ether is boiled off during the heating of the mixture and the results are as in Example III.

EXAMPLE V

Eight and sixty-four one-hundredths (8.64) parts of ortho-phenylene-diamine, 6.60 parts of pyrocatechol, and 4.32 parts of ortho-aminophenol are dissolved in 100 parts of water having added thereto 2 parts of a 30 per cent bisulfite solution and 2 parts of decolorizing carbon. The solution is heated to boiling temperature and 1 part of sodium hydrosulfite is added. The hot solution is filtered, and the filtrate is cooled, whereupon crystals having a melting point of 82.9–84° C. are recovered. These are crystals of a ternary compound having the components in the molecular ratio of 4 mols of ortho-phenylene-diamine, 3 mols of pyrocatechol and 2 mols of ortho-amino-phenol.

EXAMPLE VI

Twenty-one and six-tenths (21.6) parts of ortho-phenylene-diamine and 11.0 parts of hydroquinone are dissolved in 125 parts of water with the addition of 2 parts of a 30 per cent sodium bisulfite aqueous solution and 1 part of decolorizing carbon. The mixture is brought to boiling temperature and ½ part of sodium hydrosulfite is added. The hot solution is filtered and the filtrate is cooled. Binary crystals of ortho-phenylene-diamine and hydroquinone having a melting point of 105.5–106° C. are recovered.

To sixteen and three-tenths (16.3) parts of this binary, there is added 5.45 parts of para-amino-phenol in 85 parts of water together with 1 part of a 30 per cent sodium bisulfite and 2 parts of decolorizing carbon. The mixture is boiled and filtered while hot. The cooled filtrate yields crystals of the ternary compound having a melting point of 99.6–100.2° C. The mother liquor is concentrated and cooled to obtain a second crop of crystals. A total of 21 parts are recovered from the 21.75 parts of charge, the crystals from the two recoveries having substantially the same melting point.

EXAMPLE VII

Twenty-one and six-tenths (21.6) parts of ortho-phenylene-diamine, 11.0 parts of hydro-quinone, and 5.45 parts of ortho-amino-phenol are dissolved at boiling temperature in 190 parts of water to which is added 2 parts of a 30 per cent aqueous solution of sodium bisulfite and 2 parts of decolorizing carbon. One (1) part of sodium hydrosulfite is added and the hot solution is filtered. The filtrate is cooled and crystals of the ternary, melting at 103–103.5° C., is recovered. A mother liquor is concentrated and cooled to obtain a second crop of crystals. A total of 33 parts of the ternary are recovered from the 38.05 parts of the materials charged. This ternary contains the components in the molecular ratio of 4 mols of ortho-phenylene-diamine, 2 mols of hydroquinone, and 1 mol of ortho-amino-phenol.

EXAMPLE VIII

Twenty-one and six-tenths (21.6) parts of ortho-phenylene-diamine, 25.2 parts of pyrogallol, and 10.9 parts of para-amino-phenol are dissolved in 100 parts of boiling water to which is added 1 part of a 30 per cent sodium bisulfite aqueous solution and 2 parts of decolorizing carbon. While this solution is boiling, ½ part of sodium hydrosulfite is added and the mixture is filtered. The filtrate is cooled and crystals having a melting point of 88.5–89.4° C. are recovered. These crystals are a ternary compound having their components in the molecular ratio of 2 mols of ortho-phenylene-diamine, 2 mols of pyrogallol, and 1 mol of para-amino-phenol.

EXAMPLE IX

Ten and eight-tenths (10.8) parts of ortho-phenylene-diamine, 7.2 parts of chloro-hydroquinone, and 5.45 parts of para-amino-phenol are dissolved in 65 parts of water to which is added 1 part of a 30 per cent sodium bisulfite aqueous solution and 2 parts of decolorizing carbons. The solution is heated to boiling and ½ part of sodium hydrosulfite is added. The hot solution is filtered and the filtrate is cooled. Crystals having a melting point of 75–76° C. are collected, which crystals are a ternary composed of 2 mols of ortho-phenylene-diamine, 1 mol of choloro-hydroquinone, and 1 mol of para-amino-phenol.

EXAMPLE X

Example IX is repeated substituting 9.45 parts of bromo-hydroquinone for the 7.2 parts of chloro-hydroquinone and crystals having a melting point of 85–87.8° C. are recovered.

EXAMPLE XI

Ten and eight-tenths (10.8) parts of ortho-phenylene-diamine, 15.8 parts of chloro-toluhydroquinone (4-chloro-1-methyl-2,5-hydroxybenzene), and 10.9 parts of para-amino-phenol are dissolved in 105 parts of water to which is added 2 parts of a 30 per cent solution of sodium bisulfite and 2 parts of decolorizing carbon. The solution is heated to boiling and 1 part of sodium hydrosulfite is added. The hot solution is filtered and the filtrate is cooled to 5° C. and the 34 parts of crystals of the ternary body are recovered. These crystals have a melting point of 118–119° C.

Not all ortho-phenylene-diamines are capable of forming the addition compounds. This invention includes ortho-phenylene-diamines of the formula

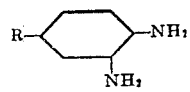

wherein R is hydrogen, halogen, or methyl. The unsubstituted ortho-phenylene-diamine and the 4-chloro- and 4-methyl- compounds are preferred.

Polyhydroxy-benzenes suitable for use in the present invention include both unsubstituted and substituted compounds, such, for example, as hydroquinone, pyrogallol, pyrocatechol, resorcinol, chloro-hydroquinone, chloro-tolu-hydroquinone, etc. Accordingly, "a polyhydroxybenzene" as used in this application, means a member of the group consisting of unsubstituted and substituted poly-hydroxy-benzenes.

Para-amino-phenol and ortho-amino-phenol may be used for the third component. Para-amino-phenol is preferred.

The raw materials need not be of high purity since the process of making the addition compounds automatically removes practically all of the impurities during the crystallizing step.

As is shown by the examples, the three components combine in molecular ratios of small whole numbers. Using a particular selection of three components, there is only one ratio which will give a crystalline product having a sharp melting point. In other words, the three components do not combine in any and all molecular proportions, but only in one specific ratio for each set of components.

The process for making the ternary bodies is usually carried out in aqueous solution. However, where one of the components is relatively insoluble in water, such component may be dissolved in an organic solvent therefor and mixed in organic solvent solution with the other components in aqueous solution. This procedure is illustrated in Example IV.

In general, the components may be combined by heating in aqueous solution. However, the process is much improved by the presence of sodium bisulfite and, hence, the presence of this material is preferred. The decolorizing carbon used in the examples removes impurities. Where desirable, it may be omitted, especially when pure starting materials are used.

Where the formation of the ternary is difficult, it is sometimes desirable to first form a binary and then add the third component. This is illustrated in Example VI. This procedure may be used whenever desired.

The new ternary compounds made according to the present invention when used as photographic developing agents produce very fine grain photographic images, which, at the same time, are characterized by high speed.

The developing agents may be used with the usual additional ingredients of a photographic developing bath. For example, excellent results can be obtained by developing for 18 minutes at 20° C. with a both of the following formula:

Formula A

|  | Parts |
|---|---|
| Ternary body | 4 |
| Sodium sulfite (anhydrous) | 20 |
| Borax | 2 |
| Water | 500 |

With the ternary body of Example I and the above formula, the pH is 8.16. At this pH, there is good film speed while maintaining fine grain. The chief characteristic of the H & D curve made by using this developer in this formula on a standard film is the long straight line portion of the curve. This makes for great latitude with varying exposures, especially with the long exposures. The ternary bodies of the present invention are of special value with high speed, negative types of silver halide emulsions. Such emulsions generally tend toward graininess which the present developers prevent. While it is true that characteristics of the H & D curve depend on the emulsion of the photographic material as well as on the developer, the characteristics of these new developers which make for a long straight line portion to the H & D curve, will still tend to be imposed on the H & D curve no matter what the emulsion. In other words, this particular effect is a characteristic of the developer and if the developer is used with an emulsion which already has a long straight line portion to its H & D curve, the latitude would still be greatly increased. If it is used with an emulsion that has not much latitude, the effect will not be as great, but still would be greater than if a standard developer were used.

One may get even greater film speed by using a developing formula of higher pH. For example, if the ternary of Example I is used in the following formula

Formula B

|  | Parts |
|---|---|
| Ternary body | 4 |
| Sodium sulfite (anhydrous) | 4 |
| Borax | 4 |
| Water | 500 | the pH is 8.8. This formula will give greater film speed on ultra speed films, especially if development is prolonged to 30 minutes or if the temperature is raised to 27-30° C. In general, if fine grain characteristics are desired, the pH of the developing bath should be kept around 8.2 or lower.

In the above developer formulae, any alkali, such, for example, as sodium carbonate, potassium carbonate, sodium hydroxide, trissodium phosphate, etc., may be substituted for the borax, although borax is preferred. The amount of sodium sulfite may be changed, and, if keeping qualities are not desired, the sodium sulfite may be omitted. Potassium bromide may be added.

In general, it may be stated that the new agents may be substituted for the prior art reducing agents in known developer formulas, particularly fine grain developer formulas, with improved results in definition of the resulting image and with greatly increased latitude in exposure time of the silver halide during formation of the latent image.

The developing agents made according to the present invention are also useful in color-forming developers. For example, 4 grams of 2,4-dichloro-alpha-naphthol dissolved in sufficient ethyl alcohol to make a clear solution is added to the following formula:

Formula C

|  | Parts |
|---|---|
| Ternary body of Example I | 10 |
| Sodium sulfite (anhydrous) | 5 |
| Sodium carbonate (anhydrous) | 25 |
| Water | 1000 |

This developer, when used upon an exposed silver halide emulsion produces, in addition to the silver image, a blue-green dye image. The silver image may be removed by any prior means, such as, for example, "Farmer's reducer," leaving a clear dye image. By the use of other dye components, other colored images may be obtained.

It is apparent that many widely different embodiments of this invention may be made without departing from the spirit and scope thereof, and, therefore, it is not intended to be limited except as indicated in the appended claims.

I claim:

1. As a new product the crystalline ternary addition compound of each of the three compounds, a polyhydroxy benzene, a member of the group consisting of ortho-aminophenol and para-aminophenol, and a compound of the formula:

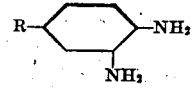

wherein R is a member of the group consisting of hydrogen, halogen, and alkyl, characterized in that said three compounds are present in molecular ratios of small whole numbers, said addition compound having a sharp melting point.

2. As a new product the crystalline ternary addition compound of each of the three compounds, a polyhydroxy benzene, para-aminophenol and ortho-phenylenediamine, characterized in that said three compounds are present in molecular ratios of small whole numbers, said addition compound having a sharp melting point.

3. As a new product the crystalline ternary addition compound of equimolecular proportions of the three compounds pyrocatechol, para-aminophenol, and ortho-phenylenediamine, said addition compound having a melting point of 73 to 74° C.

4. As a new product the crystalline ternary addition compound of each of the three compounds hydroquinone, part-aminophenol, and ortho-phenylenediamine in the molecular proportion 1:1:2, respectively, said addition compound having a melting point of 99.6 to 100.2° C.

5. As a new product the crystalline ternary addition compounds of each of the three compounds pyrogallol, para-aminophenol, and ortho-phenylenediamine in the molecular proportion of 2:1:2, respectively, said addition compound having a melting point of 88.5 to 89.4° C.

ROBERT C. LYON.